United States Patent
Immel

[11] Patent Number: 6,053,816
[45] Date of Patent: Apr. 25, 2000

[54] SINGLE COMPOUND ELASTIC BAND WITH EMBEDDED METALLIC COIL REINFORCEMENT AND TOY RIDING APPARATUS INCORPORATING SAME

[75] Inventor: Charles M. Immel, Richardson, Tex.

[73] Assignee: CMI Rubber Company, Inc., Garland, Tex.

[21] Appl. No.: 09/192,921

[22] Filed: Nov. 16, 1998

[51] Int. Cl.[7] ................................................. A63G 13/08
[52] U.S. Cl. ........................... 472/103; 472/105; 267/33
[58] Field of Search ................................. 472/103, 104, 472/105; 267/33, 74, 75; 384/125, 220

[56] References Cited

U.S. PATENT DOCUMENTS

| | | | |
|---|---|---|---|
| Re. 33,696 | 9/1991 | Stevenson | 267/33 |
| D. 280,224 | 8/1985 | Wilson | D21/191 |
| D. 315,936 | 4/1991 | Wilson et al. | D21/191 |
| D. 361,261 | 8/1995 | Amburgey et al. | D8/499 |
| 3,416,783 | 12/1968 | Tondato | 267/33 |
| 4,943,046 | 7/1990 | Beltzig | 272/1 R |
| 5,135,216 | 8/1992 | Bingham et al. | 482/130 |
| 5,160,122 | 11/1992 | Balsells | 267/167 |
| 5,242,353 | 9/1993 | Cole et al. | 482/129 |
| 5,328,410 | 7/1994 | Amburgey et al. | 472/99 |

*Primary Examiner*—Kien T. Nguyen
*Attorney, Agent, or Firm*—Sidley & Austin

[57] ABSTRACT

An elastic band (90) comprises a pair of spaced apart retaining sections (92) and a center section (96) formed of an elastomer and extending between the retaining sections. Each retaining section has an elastomer matrix (98) and a hole (94) formed therethrough. At least one of the retaining sections includes a metallic coil spring (100) embedded in the elastomer matrix such that coils (102) of the spring encircle the hole. The elastomer of the retaining section matrix and the elastomer of the center section are the same compound. The elastic band (90) can be incorporated into a toy riding apparatus (200) incorporating a base (202), a rider support device (206), and a plurality of elastic bands (90). The base includes a plurality of support posts (204) extending upwardly from the base. Each of the elastic bands is connected between the rider support device and one of the plurality of support posts such that rider support device is suspended from the support posts by the bands. The rider support device can be formed in the shape of a horse.

14 Claims, 6 Drawing Sheets

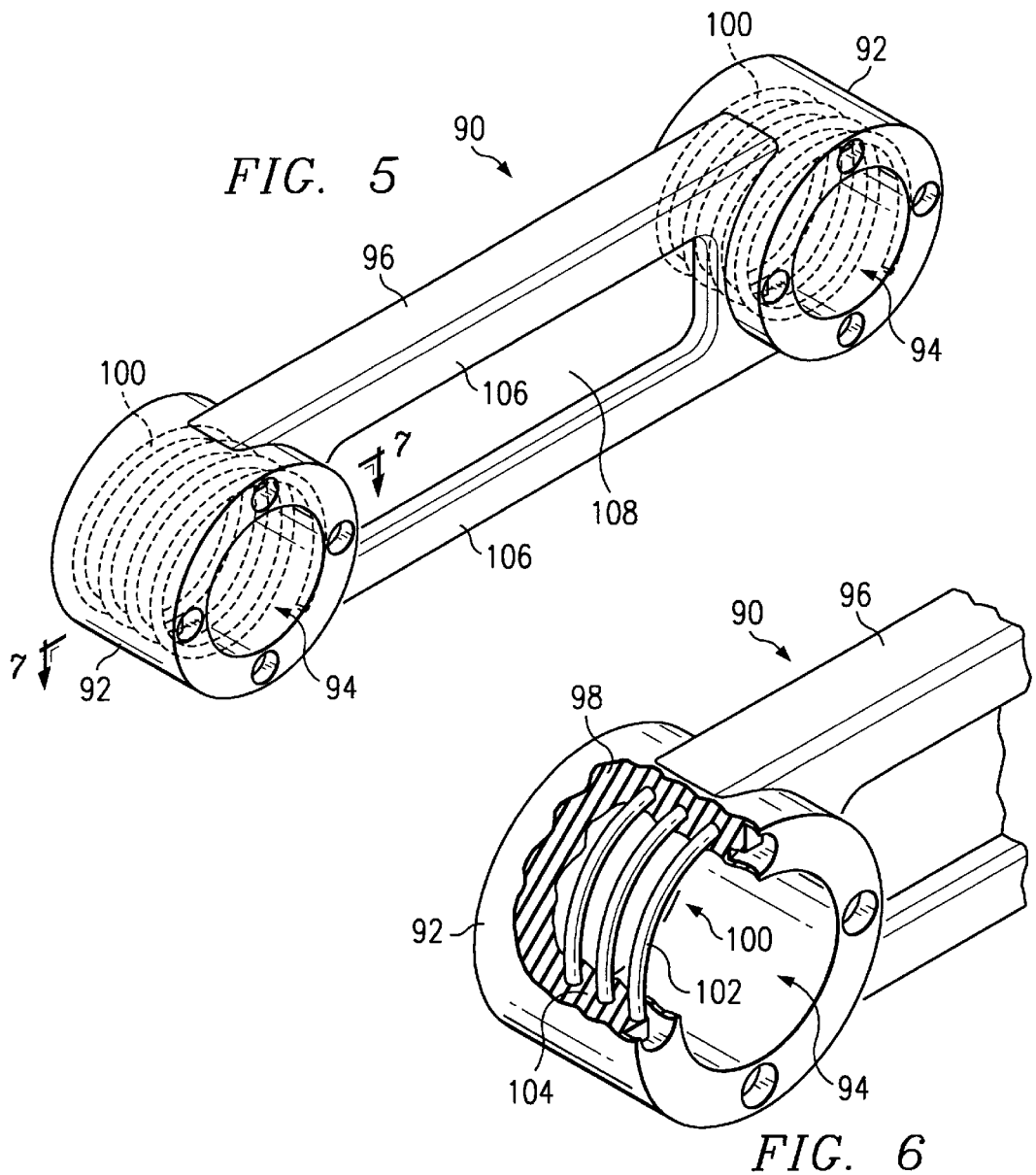
FIG. 5
FIG. 6
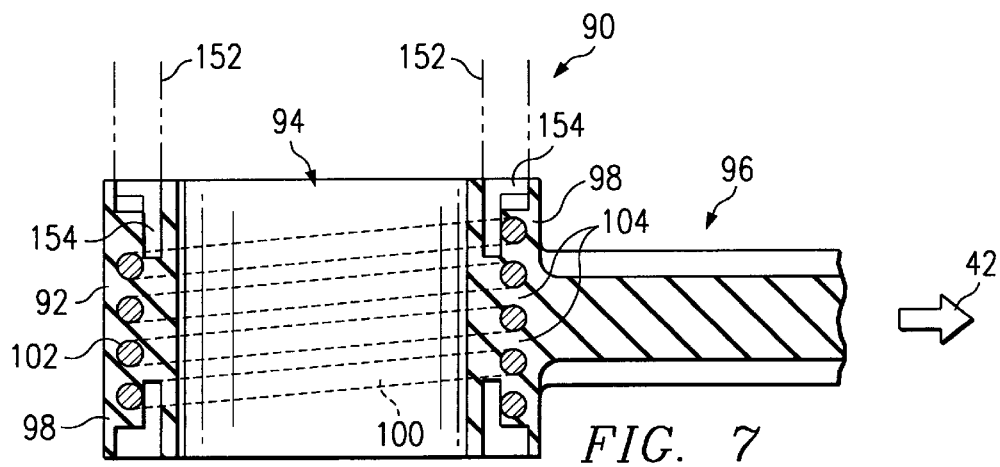
FIG. 7

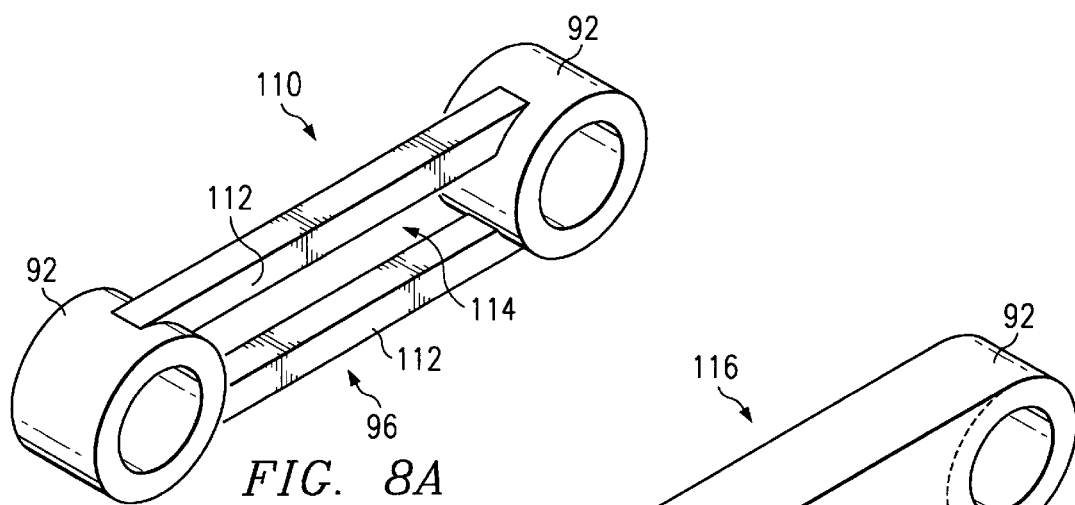
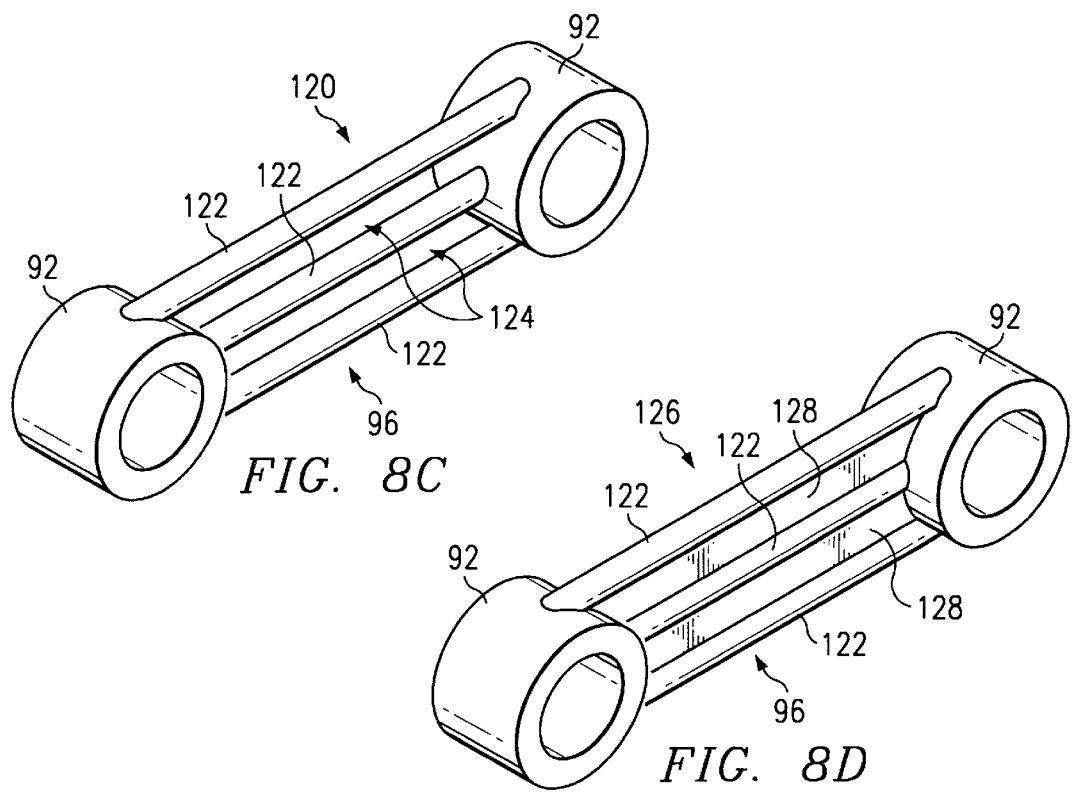

SINGLE COMPOUND ELASTIC BAND WITH EMBEDDED METALLIC COIL REINFORCEMENT AND TOY RIDING APPARATUS INCORPORATING SAME

TECHNICAL FIELD OF THE INVENTION

The present invention relates to elastic bands of the type used to provide a biasing force between machine elements. In one aspect, it relates an elastic band having an embedded metallic coil reinforcement surrounding the attachment hole.

BACKGROUND OF THE INVENTION

It is well known to use elastic bands (also known as elastic straps) made of rubber or other elastomer compounds to provide a tensile biasing force between machine elements. For example, U.S. Pat. Nos. D280,224 to Wilson and D315,936 to Wilson et al. disclose straps for use on exercise machines, and U.S. Pat. No. D361,261 to Amburgey et al. discloses a suspension band resembling those used on toy riding apparatus.

A common configuration for elastic bands comprises an elastic center section extending between two elastic retaining sections, each retaining section having an attachment hole formed therethrough for connection to one of the machine elements which is to be biased. Such bands are commonly manufactured from molded rubber compounds or other elastomeric materials which are cured under elevated heat and pressure. Bands having different tensile bias values and/or different elongation values can be obtained by changing the cross-sectional area of the center section and/or by changing the rubber compound or elastomer compound used in the center section.

When an elastic band of the type described above is placed in operational tension (i.e., tension directed along a line connecting the attachment holes), portions of the retaining sections tend to elongate in the direction of the applied tension. If the retaining section elongates, portions of the inboard edge of the retaining section are pulled away from the machine element to which it is attached, thereby increasing the span of the attachment hole in the direction of the applied tension and creating a gap between the band and the machine element. Any object which is placed into this gap when the band is elongated by tension can be pinched or crushed between the band and the machine element when the tension is released and the band returns to its original configuration. It is therefore frequently desirable to reinforce the retaining section of elastic bands in order to reduce the amount of attachment hole elongation which occurs for a given tension and thereby minimize or eliminate any gap and the associated pinching or crushing hazard.

Toy riding apparatus of the type having a rider support device (commonly shaped to resemble a horse) which is elastically suspended from a base or frame such that the child can rock back and forth to simulate riding are well known. Many such rocking toys use coil springs connected between the rider support (e.g., the horse) and the base for their suspension mechanism. Some such riding toys, however, use elastic bands of the type described above rather than coil springs for their suspension mechanism. U.S. Pat. No. 5,328,410 to Amburgey et al. discloses such a toy riding apparatus using elastic bands for suspending the rider support device from a base. Avoidance of any gaps between the elastic bands and the support frame caused by elongation of the bands' retaining sections is especially important in the case of toy riding apparatus because children may not appreciate the hazards and can be injured if their fingers, toes, etc. should become caught in such gaps when the tension is released.

Elastic bands known in the prior art utilize several approaches to reinforce the retaining section and reduce attachment hole elongation. Some elastic bands include retaining sections having outboard walls (i.e., the walls on the outboard half of each retaining section) which are thick compared to the span of the attachment hole. For purposes of this application, a wall is considered thick if the wall has a thickness, measured radially from the center of the attachment hole, which is at least equal to the span of the respective attachment hole (the span being the diameter of a round hole or the distance across a non-round hole measured perpendicular to the line of tension). In comparison to bands having thin (i.e., not thick) walls, such radially thick outboard walls can reduce the amount of retaining section elongation and the size of the attachment hole gap for a given tension in the band. However, significantly more material is required to produce bands having thick walls, and the radial protrusion of the walls can present a problem in situations where space is limited, or in situations where the protruding walls are aesthetically undesirable.

Other elastic bands are known in which two or more different elastomer compounds are cured together in adjacent portions of a single mold to form a unitary article which, after curing, still has identifiably different compounds in different areas of the band. Such bands are sometimes known as multi-compound bands. A multi-compound band can be formed with a relatively hard (i.e., higher durometer) rubber compound in the retaining sections and a relatively soft (i.e., lower durometer) rubber compound in the central section. In such bands, the hard rubber compound reinforces the retaining section and reduces elongation of the attachment hole in comparison to a band formed completely of the soft rubber, while the soft rubber in the central section provides a lower tensile biasing force in comparison to a band formed completely of the hard rubber. Such multi-compound bands can thus reduce retaining section elongation and the size of the associated gap without requiring thick-walled retaining sections. However, the manufacture of multi-compound bands is more complex than single compound bands since the different uncured rubber compounds must be accurately placed in their respective areas of the mold cavity and prevented from shifting as the rubber is cured. Accordingly, multi-compound bands can be more expensive to produce than single compound bands. In addition, as a multi-compound band ages under tension and is cycled in use, the different rubber compounds can sometimes separate or "de-bond" from one another along the surface of the band. Even though the band's overall elastic properties may change little when such surface separation occurs, it is nonetheless typically viewed as a failure of the band.

It is also known to embed a smooth-walled metallic cylinder within the rubber matrix of the retaining section of a multi-compound elastic band to further reinforce the retaining section against elongation under tension. However, the manufacture of bands with embedded smooth-walled metallic cylinders typically requires the cylinders to be carefully cleaned (e.g., using sandblasting, solvents, etchants, or the like) to remove any surface dirt, oil or rust, and then coated with a chemical bonding agent to ensure that a good bond is formed between the metallic cylinder walls and the surrounding elastomer compounds in the retaining section during curing. Without a good bond, the rubber on the inboard half of the retaining section can be pulled away from the metallic cylinder when tension is applied to the band, thereby forming an internal void within the retaining section which can lead to band failure. Further, the cylinders used in such bands must have a precise length to avoid manufacturing problems. If the cylinder is too long, the cylinder can prevent the mold from closing properly; if the cylinder is too short, the cylinder can move around in the mold during the molding process. In addition, the manufacture of multi-compound bands with embedded smooth-walled metallic cylinders is further complicated because the solid cylinders can block the flow of uncured rubber into certain portions of the mold. Also, as with all multi-compound bands, the various different uncured rubber compounds must be accurately placed in their respective areas of the mold cavity and prevented from shifting as the rubber is cured.

A need therefore exists, for an elastic band formed from a single rubber or elastomer compound, which is reinforced to resist elongation of the retaining section under tension, and which does not require surface preparation or precise lengths for its embedded metallic components.

A need further exists, for a toy riding apparatus which incorporates elastic bands for suspension of the rider support device, wherein the bands are formed from a single rubber or elastomer compound, are reinforced to resist elongation of the retaining section under tension, and do not require surface preparation or precise lengths for its embedded metallic components.

SUMMARY OF THE INVENTION

In one aspect of the current invention, an elastic band is provided comprising a pair of spaced apart retaining sections and a center section formed of an elastomer and extending between the retaining sections. Each retaining section has an elastomer matrix and a hole formed therethrough. At least one of the retaining sections includes a metallic coil spring embedded in the elastomer matrix such that the coils of the spring encompass the hole. The elastomer of the retaining section matrix and the elastomer of the center section are the same compound.

In another embodiment of the current invention, the embedded spring is disposed concentrically around the hole. In yet another embodiment, both of the retaining sections include a metallic coil spring embedded in the elastomer matrix. In a further embodiment, the band is a unitary article formed by molding the retaining sections and the center section together in a single operation. In still further embodiments, different configurations for the center section are provided.

In another aspect of the current invention, a method of forming a single compound elastic band with embedded metallic coil reinforcement is provided comprising the steps of: providing a mold assembly forming a pair of spaced apart retaining section cavities, a cavity for a center section extending between the retaining section cavities, and a pair of cores, each of the cores being located in a different one of the retaining section cavities; inserting a metallic coil spring into at least one of the retaining section cavities such that the spring is positioned with its coils encircling the core; introducing a single compound of uncured elastomer into the retaining section cavities and the center section cavity of the mold; curing the elastomer in the mold cavities to form a single compound elastic band with embedded metallic coil reinforcement.

In yet another aspect of the current invention, a toy riding apparatus is provided comprising a base having a plurality of support posts extending upwardly therefrom, a rider support device, and a plurality of elastic suspension bands. Each of the bands is connected between the rider support device and one of the plurality of support posts such that the rider support device is suspended from the support posts by the band. Each of the bands includes a pair of spaced apart retaining sections and a center sections formed of an elastomer and extending between the retaining sections. Each of the retaining sections has an elastomer matrix and a hole formed therethrough. At least one of the retaining sections includes a metallic coil spring embedded in the elastomer matrix such that the coils of the spring encompass the hole. The elastomer of the retaining section matrix and the elastomer of the center section are the same compound.

BRIEF DESCRIPTION OF THE DRAWINGS

A more complete understanding of the present invention and the advantages thereof will be apparent from the following detailed description when taken in conjunction with the accompanying drawings in which:

FIG. 5 is a perspective view of an elastic band according to a first embodiment of the current invention;

FIG. 6 is a perspective view with portions broken away of a retaining section of the current invention showing the embedded spring;

FIG. 7 is cross-sectional top view of the retaining section of the band of FIG. 5 taken along lines 7—7 of FIG. 5;

FIGS. 8A–8D are perspective views showing alternative embodiments of the current invention with different center section configurations;

DETAILED DESCRIPTION

Note that for purposes of this application, the terms elastomer and rubber are used interchangeably to refer to any of the various natural and synthetic elastic substances resembling rubber known to those of ordinary skill in the art.

Figure 1:
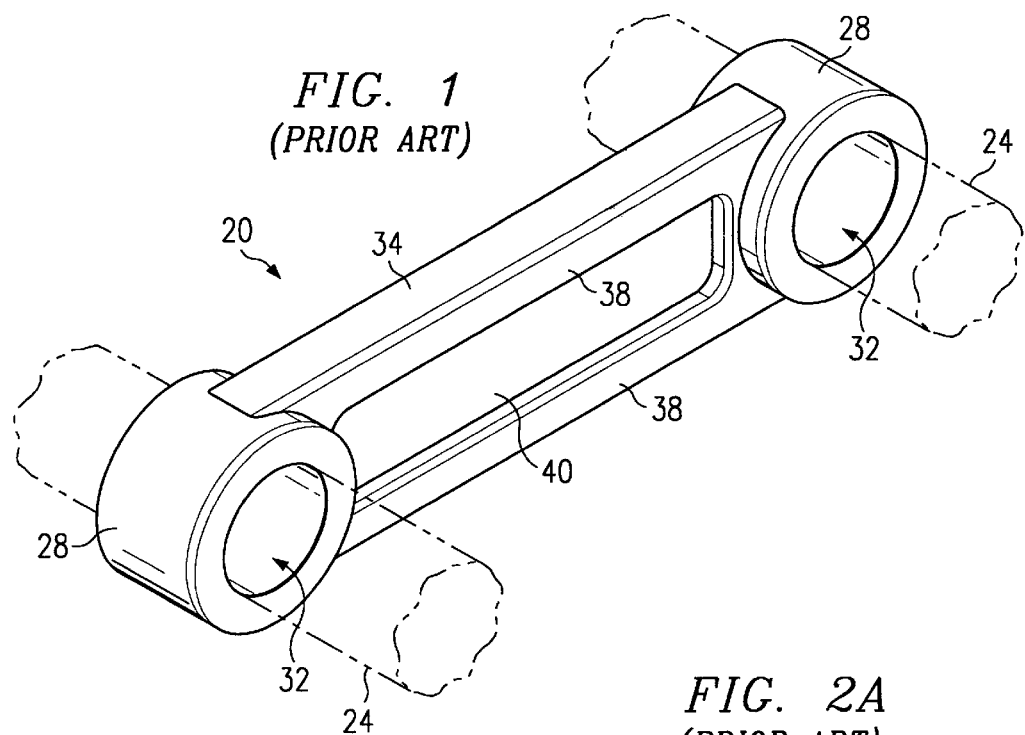
FIG. 1 is a perspective view of an elastic band according to the prior art.

Referring now to the drawings wherein like-referenced characters designate like or corresponding parts throughout several views, and more specifically to FIG. 1, there is shown an elastic band 20 according to the prior art mounted on a pair of machine elements 24 (shown in phantom). The elastic band 20 comprises a pair of solid elastomer retaining sections 28, with each retaining section having an attachment hole 32 formed therethrough for attachment to its respective machine element 24. An elastic center section 34, also formed of elastomer, extends between the retaining sections 28. In the prior art example shown in FIG. 1, the center section 34 includes a pair of band sections 38 extending between the retaining sections 28 and a web section 40 formed of thinner material extending between the band sections and the retaining sections.

Figure 2A:
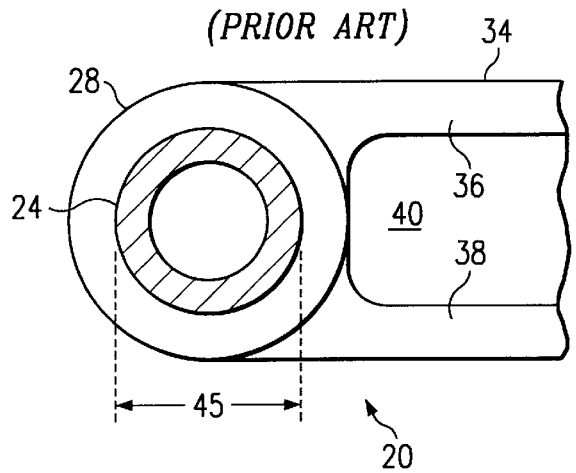
FIG. 2A is a partial side view of the prior art band of FIG. 1 when the band is not loaded in tension.
Figure 2B:
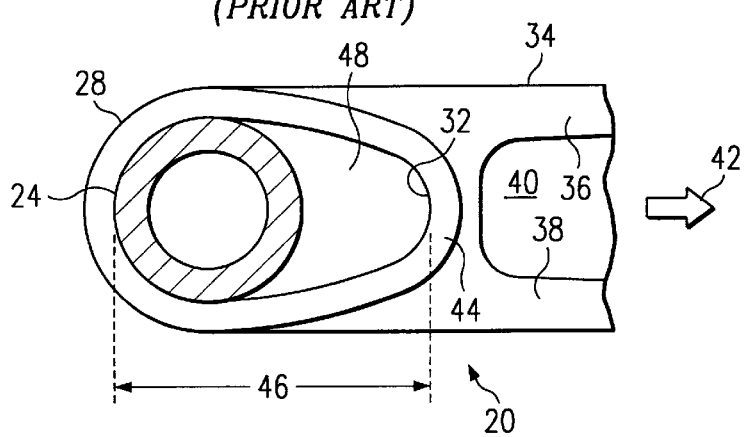
FIG. 2B is a partial side view, similar to FIG. 2A, of the prior art band showing the gap which forms when the band is subject to a tension load.

Referring now also to FIGS. 2A and 2B, a portion of the prior art elastic band is shown in side view to illustrate the problem of retaining section elongation. FIG. 2A shows prior art elastic band 20 in a relaxed state which does not produce any bias between the two machine elements. It will be noted in this case the retaining section 28 has an inside diameter (denoted by reference numeral 45) which fits closely against the machine element 24, producing only a slight gap at the interface therebetween. Referring now to FIG. 2B, when the prior art band 20 is subjected to tension loading, denoted in this case by arrow 42, the elastic parts of the band, including the center section 34 and retaining section 28, will elongate in the direction of tension 42. As the retaining section 28 elongates, its inboard portion 44 can be pulled away from the machine element 24 to which it is attached, thereby increasing the span (denoted by reference numeral 46) of the attachment hole 32 in the direction of tension 42 and creating a gap 48 between the band and the machine element. It is this gap 48 which represents a pinching or crushing hazard to any object which is inserted into the gap when the band 20 is under tension.

Figure 3:
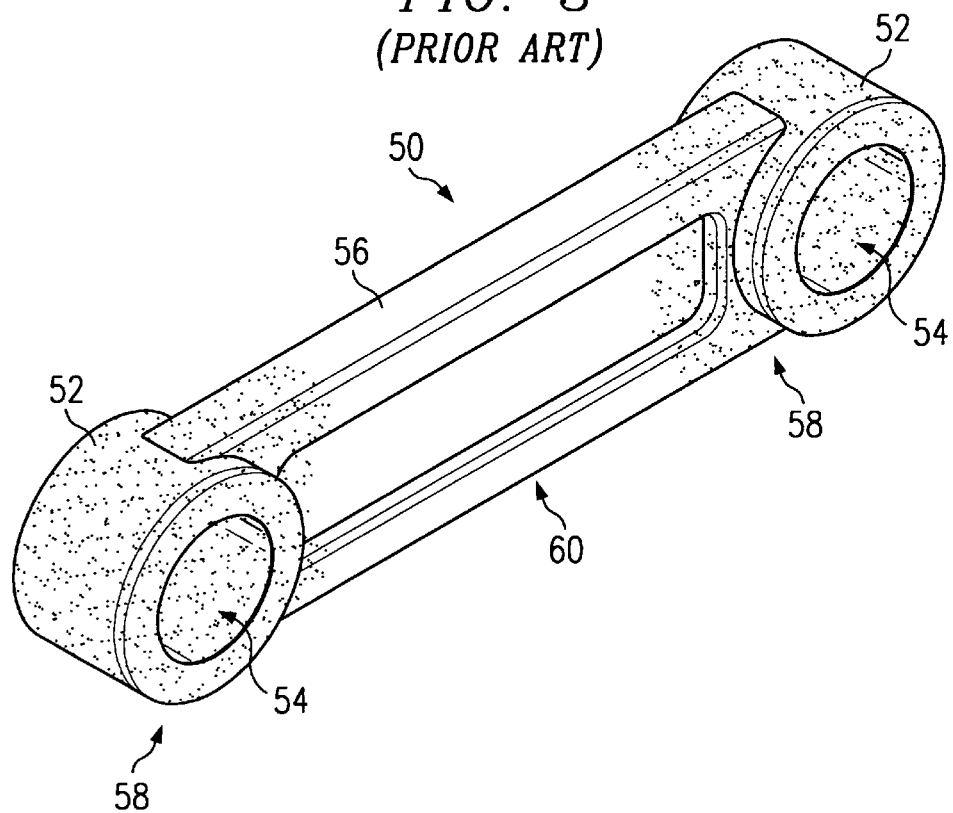
FIG. 3 is a perspective view of another elastic band according to the prior art having portions formed of different elastomer compounds.

Referring now to FIG. 3, shown is another elastic band 50 according to the prior art. The band 50 is a multi-compound band having a physical layout generally similar to the prior art band 20, with a pair of spaced apart retaining sections 52 each having an attachment hole 54 formed therethrough and an elastic center section 56 extending between the retaining sections. In the band 50, however, a relatively hard (i.e., higher durometer) rubber compound is used for the retaining sections 52 and nearby portions of the center section 56 and a relatively soft (i.e., lower durometer) rubber compound is used for the majority of the center section. For purposes of illustration, in FIG. 3 the areas 58 formed of hard rubber compounds are denoted with stippling, while the area 60 formed of soft rubber compounds is shown unstippled. As previously discussed, the hard rubber compound in the areas 58 reinforces the retaining sections 52 and reduces elongation of the attachment holes 54 under tension when compared to a band formed completely of the soft rubber compound. The soft rubber compound in the central section 60 provides a lower biasing force or greater elongation in comparison to a band formed completely of the hard rubber compound.

Figure 4:
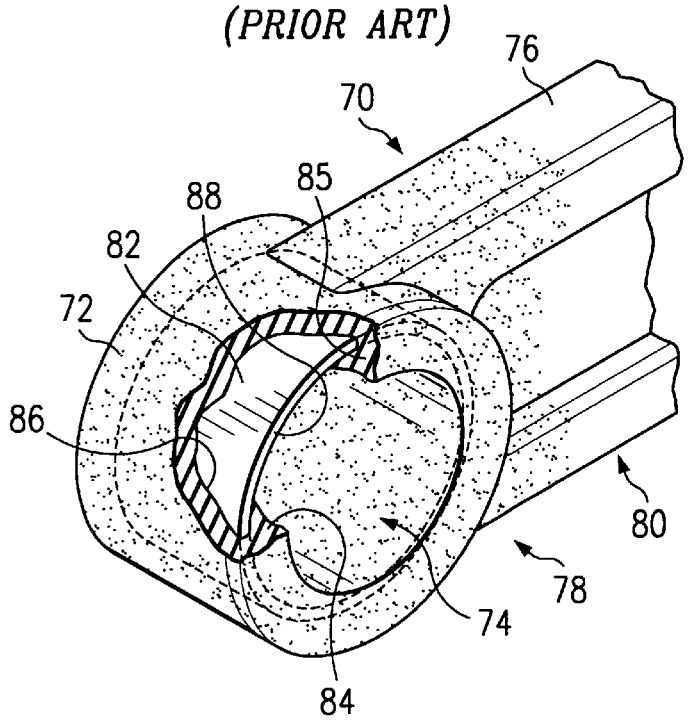
FIG. 4 is a partial perspective view with portions broken away of another elastic band according to the prior art having portions formed with different elastomer compounds and having a smooth-walled cylinder embedded in the retaining portion.

Referring now to FIG. 4, shown is a portion of another elastic band 70 according to the prior art. The band 70 has a configuration generally similar to the prior art bands 20 and 50 previously discussed, including a pair of retaining sections 72 having attachment holes 74 formed therethrough and a center section 76 extending between the retaining sections. The prior art band 70 is a multi-compound band including areas 78 of relatively hard elastomeric compound which includes the retaining section 72 and adjacent portions of the center section 76, while the remaining area 80 of the center section is formed of a relatively softer elastomeric compound. Note that the area 78 of hard elastomer are denoted with stippling in FIG. 4 as previously discussed for FIG. 3. To further reinforce the retaining section 72, a smooth-walled metallic cylinder 82 is embedded in the elastomer matrix 84 of the retaining section 72. Note that the cylinder 82 essentially divides the elastomer matrix 84 into radially inner and outer annular sections which are directly joined only by the lateral edges 85 of the matrix. Since the center section 76 is only connected to the outer annular section of the matrix 84, the smooth-walled cylinder 82 can only reinforce the retaining section 72 if a strong bond is formed at the interface 86 between the metallic cylinder 82 and the elastomer matrix 84. As previously discussed, without a good bond, the rubber on the inboard portion of the retaining section 72 will be pulled away from the cylinder 82 when tension is applied to the band, thereby forming an internal void within the retaining section which can cause band failure. In addition, the edge 88 of a smooth walled cylinder 82 can tend to cut through the lateral edge 85 of the retaining section 72 if subjected to lateral loading. Such "cut through" of a reinforcing cylinder can also be considered a band failure.

Referring now to FIGS. 5–7, shown is an elastic band 90 according to a first embodiment of the current invention. The band 90 has an overall configuration similar to that of prior art bands, including retaining sections 92 having attachment holes 94 formed therethrough, and a center section 96 extending between the retaining sections. Each of the retaining sections 92 has an elastomer matrix 98 and at least one of the retaining sections includes a metallic coil spring 100 embedded in the elastomer matrix such that the coils 102 of the spring encompass the attachment hole 94. The center section 96 and the matrix 98 of the retaining sections 92 are all formed from a single rubber or elastomer compound, thus band 90 is a single compound elastic band.

Elastic bands according to the current invention have numerous advantages over prior art elastic bands. First, since the metal spring 100 reinforces the retaining sections 92 against elongation under tension, thick-walled retaining sections are not required to avoid undesirable gaps. In addition, the entire elastic band 90, including the retaining sections 92 and the center section 96, is formed using a single elastomer or rubber compound rather than using multiple compounds having different hardness. This simplifies the set-up and molding processes of manufacturing and eliminates the possibility of debonding between the compounds or other problems associated with multi-compound elastic bands. Secondly, during the molding operation used to make elastic band 90, the open construction of the spring 100 allows the uncured rubber compound to move into all parts of the mold, including the interior area of the spring. Third, as best seen in FIGS. 6 and 7, the elastomer matrix 98 of the retaining sections 92 has areas of full radial thickness (denoted by reference numeral 104) interposed between the coils 102 of the spring 100 at nominally regular intervals across the lateral width of the retaining section. As best seen in FIG. 7, these areas of full radial thickness 104 mechanically tie the elastomer on the radially interior side of the spring 100 to the elastomer on the radially exterior side of the spring to prevent the elastomer from pulling away from the spring and causing interior voids to form when the band is subject to tension as shown by arrow 42. This extensive direct connection of the elastomeric matrix 98 between and around the springs 100 in the retaining section 92 eliminates the need for a surface-to-surface bond between the spring and the elastomer matrix to provide strength. Thus, the springs 100 used in bands according to the current invention do not require costly preparation procedures prior to molding such as special cleaning or coating with chemical bonding agents. Instead, springs 100 can often be used exactly as received from the supplier, regardless of any light surface dirt, oil, or rust which may be present. As a further advantage, the areas of full radial thickness 104 also lock the spring 100 to prevent movement in the lateral direction, i.e., movement in a direction parallel to the axis of the attachment hole 94, which could cause the spring to cut through the side of the retaining section 92. The rounded edges of the spring 100 also reduce the possibility of cutting through the side of the retaining section. Thus, elastic bands according to the current invention reduce or eliminate many problems associated with elastic bands according to the prior art.

The elastic band 90 shown in FIG. 5 represents a preferred embodiment of the current invention. The elastic band 90 includes coil springs 100 in both of the retaining sections 92, however, bands having a coil spring embedded in only one retaining section are within the scope of the current invention. In addition, while the embodiment shown in FIG. 5 has attachment holes 94 which are cylindrical, it will be apparent that elastic bands having attachment holes with other shapes, including rectangular and semicircular, are within the scope of the current invention. It will be further apparent that even if a non-round attachment hole 94 is used in the retaining section 92, a coil spring can still be used, provided the spring is sized such that its coils 102 can encompass the hole. In the preferred embodiment, spring 100 is a cylindrical helical coil spring; however, coil springs having different configurations are within the scope of the current invention, provided the coils can encompass the retaining hole. Also in the preferred embodiment, the coil spring 100 is positioned concentrically around the attachment hole 94, i.e., the spring and the hole have a common center axis. While such concentric placement of the coil spring 100 within the retaining section 92 is desirable, it is not required.

The center section 96 of the preferred embodiment shown in FIG. 5 includes a pair of spaced apart band sections 106 extending between the retaining sections 92 and a web section 108 extending between the band sections and the retaining sections, the web section being thinner than the band sections in a direction defined by an axis of the attachment hole 94. Referring now to FIGS. 8A–8D, additional embodiments of the current invention are shown having different configurations for the center section 96. For example, FIG. 8A shows elastic band 110 having a center section 96 comprising two spaced apart band sections 112 separated by a hole 114 rather than a web. FIG. 8B shows elastic band 116 having a center section 96 comprising a single band 118 with a constant cross-sectional area. FIG. 8C shows elastic band 120 having a center section 96 comprising three spaced apart band sections 122 extending between the retaining sections 92. Each of the band sections 122 has a round cross section and the bands are separated by holes 124. FIG. 8D shows elastic band 126 having a center section comprising three elastic bands 122 extending between the retaining sections 92 in a fashion similar to band 120 previously discussed. The elastic band 126, however, includes webs 128 extending between the band sections 122 and the retaining sections 92. While FIGS. 5 and 8A–8D show elastic bands having numerous configurations for the center section 96, it will be readily apparent that many other configurations for the center section could be substituted for those shown without departing from the scope of the current invention.

Since the elastic band of the current invention is formed using a single elastomer or rubber compound, in the preferred embodiment the band is formed as a unitary article by molding the retaining sections and center sections together in a single operation. Accordingly, another aspect of the current invention is a method for making a single compound elastic band with embedded metallic coil reinforcement as described below and illustrated in FIGS. 9A–9C. The method of the current invention involves the use of elastomer molding techniques which are generally well known to those of ordinary skill in the art. Thus, the description below provides only those details which distinguish the method of the current invention from the prior art, and it does not include details which can be readily determined by those having ordinary skill in the molding of rubber and other elastomers.

Figure 9A:
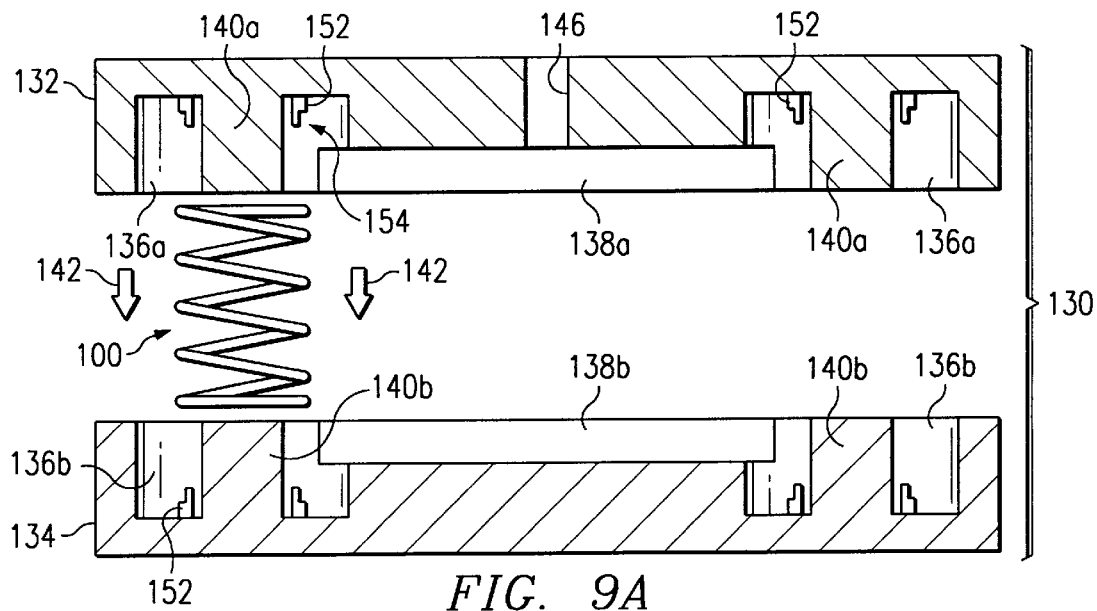
FIG. 9A is a cross-sectional side view of a mold assembly according to another aspect of the current invention when the mold assembly is in an open configuration showing insertion of a spring into the mold cavity.
Figure 9B:
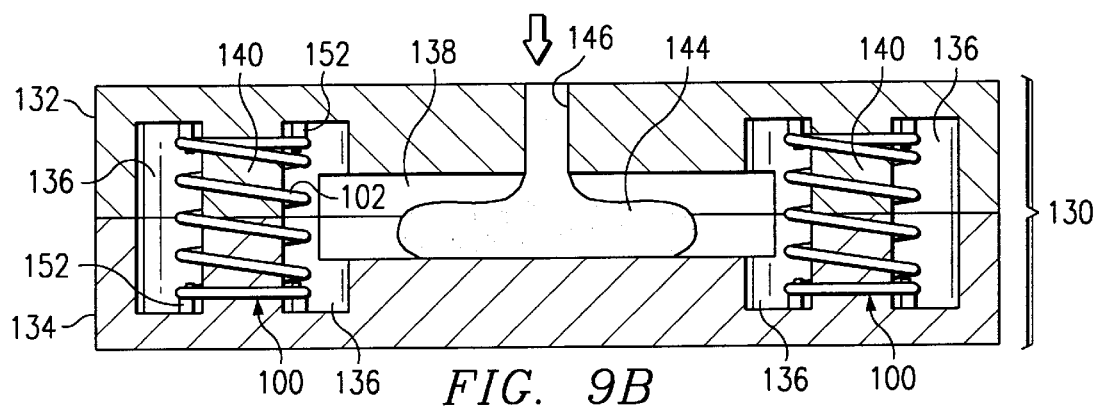
FIG. 9B is a view of the mold assembly of FIG. 9A when the mold assembly is in the closed configuration showing one method of introducing an elastomer into the mold cavity.
Figure 9C:
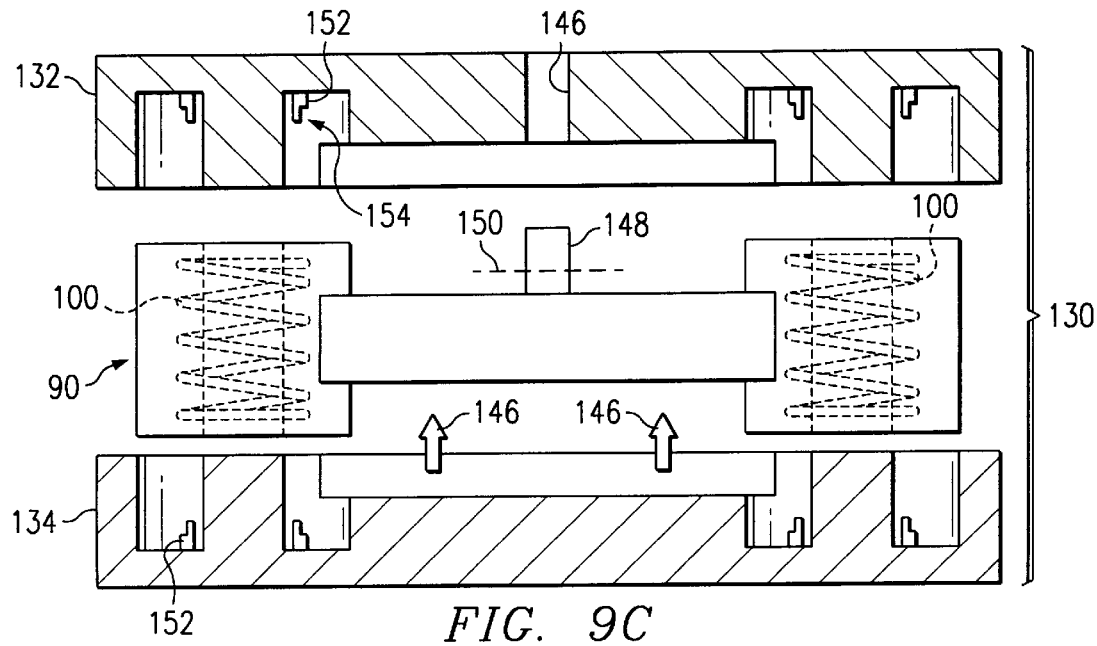
FIG. 9C is a cross-sectional view of the mold assembly of FIGS. 9A and 9B showing extraction of a finished elastic band molded therein.

The first step in the method of the current invention is to provide a suitable mold assembly for molding the elastic strap. Referring to FIGS. 9A–9C, a mold assembly 130 according to one embodiment of the current invention is shown. The mold assembly 130 comprises mold portions 132 and 134 and is movable between an open configuration, as shown in FIG. 9A, and a closed configuration, as shown in FIG. 9B. Formed on the adjacent surfaces of the mold portions 132, 134 are cavities 136a, 136b, 138a and 138b, and core pieces 140a and 140b which, when the mold assembly 130 is in the closed configuration (as shown in FIG. 9B), combine to form similarly-numbered cavities 136, 138 or cores 140 having the shape of desired features of the elastic band to be molded. For example, cavities 136a and 136b form a pair of spaced apart retaining sections cavities 136. Cavities 138a and 138b combine to form a center section cavity 138 extending between the retaining section cavities 136. Core pieces 140a and 140b combine to form a pair of cores 140, each of the cores being located in a different one of the retaining section cavities 136 and passing completely through the retaining section cavity. Note that, while the mold assembly 130 shown in FIGS. 9A and 9B includes mold portions 132, 134 which are generally symmetrical, mold portions having non-symmetrical contours can be used as is known in the art to provide the desired cavity shapes without departing from the scope of the current invention.

After a suitable mold has been provided, subsequent steps of the current invention are as follows: With the mold assembly in the open configuration (as shown in FIG. 9A), a metallic coil spring 100 is inserted into a portion of one of the retaining cavities 136 such that the coils 102 of the spring encompass the core 140 of the cavity. FIG. 9A shows spring 100 being inserted into the cavity 136b of the mold portion 134, as indicated by arrows 142. In the preferred embodiment, a spring 100 will be positioned in both of the retaining section cavities 136 such that each retaining section of the finished elastic band will be reinforced; however, the use of a single spring is within the scope of the current invention. When the mold assembly 130 is moved into the closed configuration (as shown in FIG. 9B), the springs 100 are captured within the retaining section cavities 136 with their respective coils 102 encircling the core 140 of each cavity. If it is desired to position the coil springs at a precise location within the retaining section, for example concentrically around the attachment holes of the band, then a plurality of locating features can be provided in the retaining section cavities 136a and 136b of the mold. For example, the mold assembly 130 includes locating features which are in the shape of pins 152; however, locating features having other shapes are within the scope of the invention. For concentric positioning of the spring, the pins 152 are disposed symmetrically around the core pieces 140a and 140b. The end coils of the spring 100 fit against the sides of the locating pins 152 to hold the spring in a desired position during the molding operation. The locating pins 152 can be provided with an "L"-shaped end surface 154 (also shown in FIG. 7) if it is desired to position the end of the springs 100 so that they are inset from the lateral edge of the retaining section 92. When such "L"-shaped end surfaces are used on the locating pins 152, the end coils of the spring 100 fit against the top and side surfaces of the pin (as best seen in FIG. 7).

It should also be noted, that since coil spring 100 is elastically compressible along the direction of its center axis, it is not necessary to utilize springs having a precisely known free length when manufacturing elastic bands according to the current invention. If the free length of the spring 100 is longer than the allotted space within the cavity 136, the spring will simply be compressed as the mold closes. In a preferred embodiment of the current method, each spring 100 is purposely compressed in the axial direction as the mold assembly closes to better ensure that the spring remains in the desired position during subsequent steps.

Next, a single compound of uncured rubber or elastomer is introduced into the interior of the mold assembly 130 in a quantity sufficient to fill the retaining section cavities 136 and the center section cavity 138. In the mold assembly 130 shown in FIG. 9B, the uncured rubber is introduced into a closed mold through a port 146; however, those of ordinary skill in the art will readily determine the appropriate procedure for introducing the elastomer into the mold based on the desired configuration of elastic band and the molding method used. Also, depending upon the molding method being used, the uncured elastomer can be introduced into the mold cavities when the mold assembly is either in the open configuration or the closed configuration.

Next, the elastomer in the mold cavities is cured as is known in the art to form a single compound elastic band with embedded metal coil reinforcement. Next, as shown in FIG. 9C, the mold assembly 130 is moved into the open configuration and a finished single compound elastic band 90 having embedded metal coil springs 100 is removed from the mold as indicated by arrows 146. After the finished band 90 is removed from the mold, any sprues or flash remaining from the molding process can be removed. For example, in FIG. 9C, sprue 148 resulting from the port 146 can be removed by trimming along line 150.

Yet another aspect of the current invention is a toy riding apparatus incorporating single compound elastic bands having metallic coil reinforcements. The riding apparatus of the current invention is similar in most respects to those apparatus found in the prior art, for example, the toy riding apparatus of U.S. Pat. No. 5,328,410 to Amburgey et al. However, the toy riding apparatus of the current invention differs from the prior art in its incorporation of improved elastic bands of the type formed of a single elastomer compound and having embedded metallic coil reinforcement as previously described.

Figure 10:
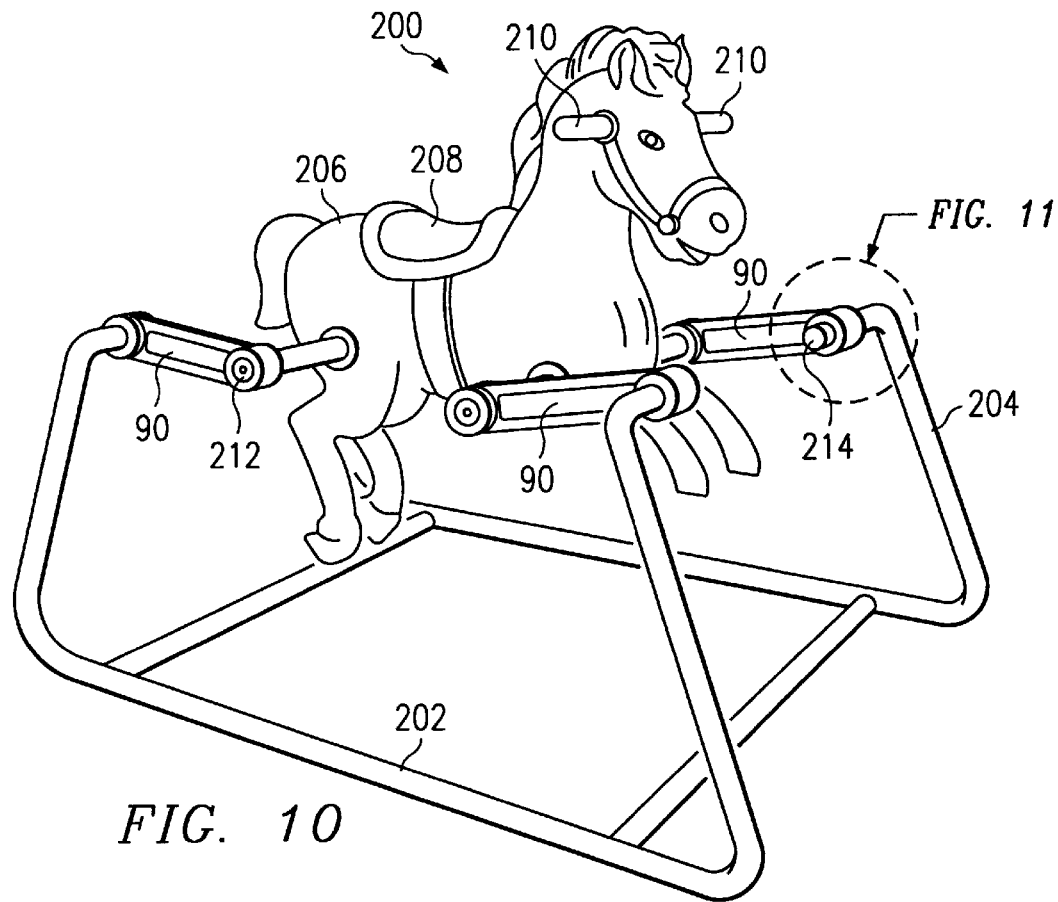
FIG. 10 is a perspective view of a toy riding apparatus according to another aspect of the current invention.
Figure 11:
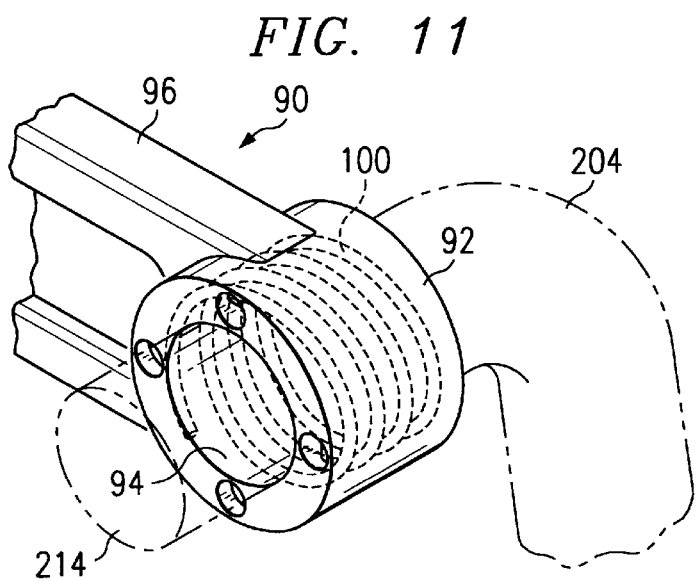
FIG. 11 is an enlarged perspective view of a portion of the apparatus of FIG. 10 showing the retaining section of the elastic suspension band with an embedded spring.

Referring now to FIGS. 10–11, shown is a toy riding apparatus 200 according to one embodiment of the current invention. The apparatus 200 comprises a base 202, a rider support device 206, and a plurality of elastic suspension bands 90. The base 202 includes a plurality of support posts 204 extending upwardly therefrom. The rider support device 206 typically includes a seat 208 for supporting the rider and handles 210 for initiating the rocking action. The rider support device 206 is typically formed of plastic and shaped to resemble a horse or other animal found attractive by children. Each of the plurality of elastic suspension bands 90 is connected between the rider support device 206 and one of the plurality of support posts 204 such that the rider support device is elastically suspended from the support posts by the bands.

Each of the elastic suspension bands 90 in apparatus 200 comprises a pair of spaced apart elastomer retaining sections 92 and an elastomer center section 96 extending therebetween. A metallic coil spring 100 is embedded in the elastomer matrix of at least one of the retaining sections 92. The center section 96 and the retaining sections 92 of the bands 90 are all formed using a single rubber or elastomer compound. Further details regarding the structure, composition and manufacture of the improved elastic bands 90 used in apparatus 200 are as previously described herein and will not be repeated. Attachment portions 212 of the rider support device 206 and attachment portions 214 of the support posts 204 are inserted through the attachment holes 94 on each of the retaining sections 92 such that the weight of the rider support device (and any rider) place tension on the elastic support bands 90. The metallic coil springs 100 embedded in the retaining sections 92 prevent the retaining sections from elongating under this tension, thus preventing the formation of gaps between the attachment portions 212, 214 and the retaining sections 92 and thereby eliminating any pinching or crushing hazard to children operating the apparatus 200. In a preferred embodiment of this invention, each of the elastic suspension bands 90 will include a metallic coil spring 100 in both of the retaining sections 92. In a further preferred embodiment, the elastic suspension bands 90 are unitary articles formed by molding the retaining sections 92 and the center sections 96 together in a single operation.

I claim:

1. An elastic band for producing a tensile bias between spaced-apart machine elements, said elastic band comprising:

a pair of spaced-apart retaining sections, each said retaining section having an elastomer matrix and a hole formed therethrough and being adapted for connection to one of said machine elements;

at least one of said retaining sections including a metallic coil spring embedded in said elastomer matrix such that coils of said spring encompass said hole, said coils defining a spring axis therethrough and being oriented such that said spring axis is substantially transverse to a line between said retaining sections; and a center section formed of an elastomer and extending between said retaining sections;

said elastomer of said retaining section matrix and said elastomer of said center section being the same compound.

2. An elastic band according to claim 1, wherein said spring is a cylindrical helical coil spring.

3. An elastic band according to claim 1, wherein said embedded spring is disposed concentrically around said hole.

4. An elastic band according to claim 1, wherein both of said retaining sections includes a metallic coil spring embedded in said elastomer matrix.

5. An elastic band according to claim 1, wherein said band is a unitary article formed by molding said retaining sections and said center section together in a single operation.

6. An elastic band according to claim 1, wherein said center section comprises:

a pair of spaced-apart band sections, each said band section extending between said retaining sections.

7. An elastic band according to claim 6, wherein said center section further comprises:

a web section extending between said retaining sections and said band sections;

wherein, in a direction defined by an axis of one of said holes in said retaining sections, said web section is thinner than said band sections.

8. An elastic band according to claim 1, wherein said center section comprises:

a plurality of spaced-apart band sections, each said band section extending between said retaining sections.

9. An elastic band according to claim 8, wherein said center section further comprises:

a plurality of web sections, each said web section extending between said retaining sections and an adjacent pair of said band sections;

wherein, in a direction defined by an axis of one of said holes in said retaining sections, said web sections are thinner than said adjacent band sections.

10. An elastic band according to claim 1, wherein said center section comprises a single member having a substantially constant cross section along an axis between said holes in said retaining sections.

11. A toy riding apparatus, comprising:

a base, said base including a plurality of support posts extending upwardly therefrom;

a rider support device; and a plurality of elastic suspension bands, each said band being connected between said rider support device and one of said plurality of support posts for producing a tensile bias between said rider support device and said one of said support posts, each said band including:

a pair of spaced-apart retaining sections, each said retaining section having a elastomer matrix and a hole formed therethrough for connection to one of said rider support device and said one of said support posts;

at least one of said retaining sections including a metallic coil spring embedded in said elastomer matrix such that coils of said spring encircle said hole, said coils defining a spring axis therethrough and being oriented such that said spring axis is substantially transverse to a line between said retaining sections; and a center section formed of an elastomer and extending between said retaining sections;

said elastomer of said retaining section matrix and said elastomer of said center section being the same compound.

12. A toy riding apparatus according to claim 11, wherein each of said elastic suspension bands includes a metallic coil spring in both of said retaining sections.

13. A toy riding apparatus according to claim 11, wherein said elastic suspension bands are unitary articles formed by molding said retaining sections and said center section together in a single operation.

14. A toy riding apparatus according to claim 11, wherein said rider support device is formed of plastic and shaped to resemble a horse.

* * * * *